Jan. 10, 1956     H. B. HEINEMANN     2,730,270
LIQUID MEASURING AND DISPENSING DEVICE
Filed June 29, 1953

INVENTOR.
Harry B. Heinemann
BY
ATTORNEY.

United States Patent Office 2,730,270
Patented Jan. 10, 1956

2,730,270
LIQUID MEASURING AND DISPENSING DEVICE

Harry B. Heinemann, Kansas City, Mo.

Application June 29, 1953, Serial No. 364,725

2 Claims. (Cl. 222—205)

This invention relates to structure for measuring and dispensing liquids, the primary object being to provide, in connection with a compressible liquid container, means to receive the liquid from the container upon squeezing of the latter, and including an arrangement of parts for measuring a predetermined amount of the liquid prior to pouring the same for ultimate use.

It is the most important object of this invention to provide a pipette structure for receiving and delivering single charges of liquid and which is devoid of spigots, stoppers, squeeze bulbs, brackets and a plurality of releasable connections as has heretofore been included in devices of this character, all to the end that predetermined quantities of the liquid may be measured and dispensed without danger of spillage.

An object hereof is to provide an improved apparatus of this character by means of the use of which the acid may be delivered to a plurality of test bottles without moving the bottles.

Another extremely important object of this invention is to provide structure as above set forth that is relatively safe when used with acids in that there are no parts likely to leak or become dislodged when placed in use, with resultant spillage of the acids on the hands and clothing of the user or spraying of the acids on the user's face.

A further object of the present invention is to provide measuring and dispensing means having a measuring chamber for receiving the liquid from the aforementioned collapsible container and into which extends a fluid passage conduit leading from within the container itself.

A still further object is to provide an improved apparatus of this character by means of the use of which there will be a saving of the acid since spilling and splashing thereof will be avoided.

Still another object is to provide an improved apparatus of this character which will be of a simple, durable and compact arrangement, easy to operate, and effective and efficient in operation.

Other objects include the way in which the device is adapted for quick and easy interchageability with any one of a number of liquid containers; the way in which the fluid flow conduit is releasably and tightly gripped in place with respect to a cap for the container so as to render the assembly leak-proof; the way in which an outlet orifice is provided in a lateral spout so that the device may be manipulated with one hand; the manner of integrally joining the measuring tube and the fluid flow conduit at one end of the tube remote from the outlet spout; and many additional more minor objects, all of which will become clear as the following specification progresses.

Figure 3:
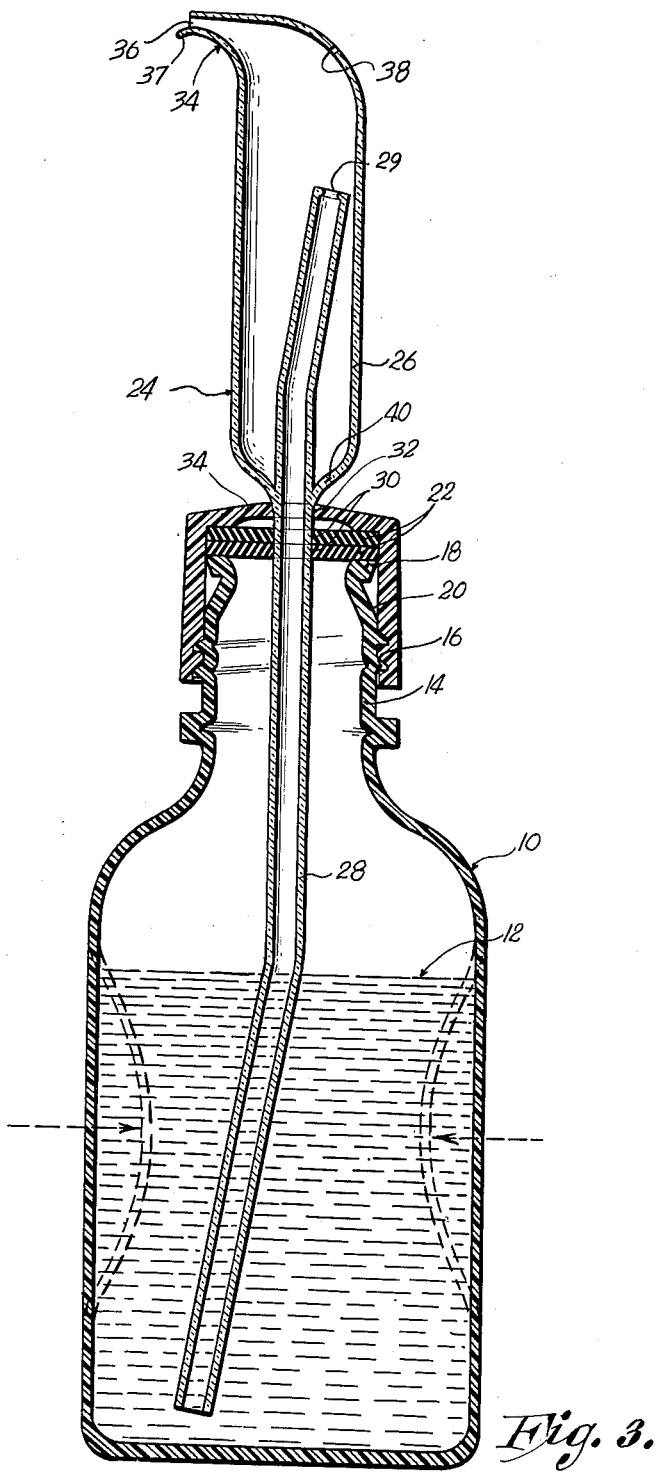
Fig. 3 is an enlarged, vertical, cross-sectional view taken on line III—III of Fig. 1.
Figure 1:
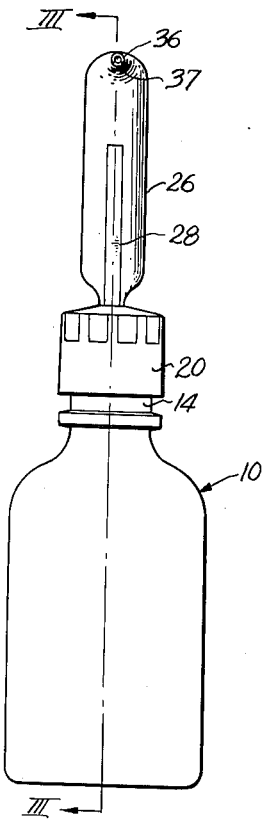
Figure 1 is a front elevational view of a liquid measuring and dispensing device made according to the present invention.
Figure 2:
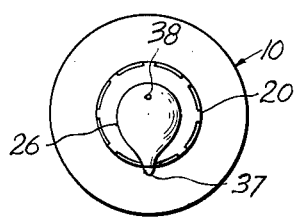
Fig. 2 is a top plan view thereof.

Pipettes and other volumetric measuring and dispensing devices have heretofore been provided for liquid containers either as attachments thereto or as a unitary part thereof. For the most part, such structures require the use of spigots or valves, stoppers and traps. Or, in other forms, rubber bulbs, together with clamps for attaching the pipette to the container, are required. Normally the bulb is releasably attached to an air inlet line and the same frequently become dislodged with a resultant spraying or spilling of the liquid upon the user. It is manifest that when the liquid is in the form of an acid, dangerous and painful burns are experienced. Such conventional structures are particularly hazardous because there is no way of predicting when a defect is likely to occur.

This invention relates therefore, in general to an apparatus for measuring and transferring fluids, but more especially to an apparatus by means of which liquid chemicals or solutions of chemicals may be measured and delivered to reaction vessels. Liquid detergents, for example, may be placed in the apparatus, measured, and transferred to water for washing dishes. Sulphuric acid may be placed in the apparatus, measured and transferred to Kjeldahl flasks or to Babcock test bottles containing milk, cream and the like. While the dispenser hereof has a wide range of uses, its application in the dairy laboratory is particularly noteworthy.

In the determination of the butterfat content of milk by the Babcock test, usually 17.6 ml. of concentrated sulphuric acid is added to 17.5 ml. of milk in a Babcock test bottle. The mixture is shaken and the bottle placed in a centrifuge wherein the fat is separated centrifugally.

The prevailing practice of the trade is to employ a dipper or graduated cylinder (usually of 9 or 17.6 ml. capacity) for measuring and transferring the sulphuric acid employed in the test, from a container to the Babcock test bottle. This process is not only slow, but involves danger to the technician from splashing or spilling of the acid. Furthermore, such a method is not always accurate since the dipper may not be completely filled.

Heretofore, automatic pipettes, burettes and similar apparatus have been employed, but as they are usually mounted in a stationary position, they must normally be filled at head height Such height presents a dangerous condition and requires that the test bottle be brought to the apparatus which is time-consuming.

As will hereinafter appear, there is little opportunity for injury or damage through use of the structure hereof and, to the extent that the same is not absolutely safe, the operator can avoid all difficulty by merely using a reasonable degree of care and caution.

A liquid container broadly designated by the number 10 is shown in the drawing and is made of any suitable flexible material such as a molded rubber or plastic for rendering the same collapsible whereby the liquid contents 12 thereof may be discharged. There are many acid resisting materials now available on the open market for producing containers of this type including many of the relatively new synthetic resins.

The container 10 has a neck 14 provided with external threads 16 and an annular lip or bead 18 at its uppermost end. An internally threaded cap 20 is provided for the neck 14 to close the uppermost open end thereof and sealing means in the nature of a pair of compressible washers 22 is provided within the cap 20 in engagement with the lip 18.

A combination measuring and dispensing device broadly designated by the numeral 24, is provided for the compressible container 10. The device 24 includes an elongated, preferably transparent, glass measuring tube 26 and a liquid flow conduit 28 that is desirably of the same material and molded integrally with the tube 26. Conduit 28 within the container 10 terminates at its lowermost open end adjacent the bottom of container 10 and extends upwardly through openings 30 in the seals 22 and an opening 32 in the top wall 34 of cap 20. Conduit 28 terminates within the tube 26 in a restricted end 29 disposed below a laterally extending pouring spout 34 forming an integral part of the tube 26 at its uppermost end. Spout 34 has an outlet orifice 36 and a lip 37, and tube 26 is provided with a vent orifice 38 in the uppermost end thereof in opposed relationship to spout 34. It is noted that the conduit 28 extends through and closes the lowermost end 40 of tube 26, and is preferably integral therewith.

While the conduit 28 is normally slidable within the openings 30 and 32 for removal therefrom, when the cap 20 is tightened on the neck 14 to clamp the seals 22 between wall 34 and lip 18, seals 22 will be compressed tightly around the conduit 28 presenting a liquid-tight fit. It is notable that conduit 28 is angled within the tube 26 toward that side of tube 26 opposite to spout 34.

Manifestly, the amount of each charge of liquid 12 is dependent upon the volumetric capacity of the tube 26 and the extent to which conduit 28 extends thereinto. In use, the operator need merely gently squeeze upon the container 10 in the direction of the arrows in Fig. 3 to discharge liquid 12 therefrom, through the conduit 28 and into the measuring tube 26. When the level of liquid in the tube 26 rises to a point at least as high as the upper end of conduit 28, the container 10 is released and any excess liquid will drain or be drawn back into the container 10 through the conduit 28 until the level of liquid 12 in the tube 26 is established at the uppermost open end of conduit 28 within tube 26.

The operator thereupon merely tips the container 10 and the device 24 thereon to pour the liquid from tube 26 through the outlet spout 34. The vent orifice 38 will facilitate such pouring operation, but since no air can flow into the container 10 while the measured charge is poured from tube 26 no additional liquid 12 will flow into the tube 26 during the pouring operation.

The angularity of conduit 28 in tube 26 and the provision of restriction 29 aids in preventing flow of fluid from conduit 28 into tube 26 during such pouring step. The lip 37, at the lower rim of the spout 34, resists backward flow of fluid and any drop remaining thereon after reverting the apparatus to vertical, may be easily removed.

It is now apparent that the structure hereof is particularly adapted for handling acids and other chemicals since there is little danger of accidental spilling. The operator only by being grossly negligent might compress the container 10 to force the liquid 12 through the orifice 36, but he will soon become accustomed to gently squeezing the container 10 sufficiently only to discharge a small amount of liquid through the conduit 28 for overflow into the tube 26.

It is obvious further that there can be no inaccuracies in the amount of the charge since no calibrated readings are needed and the user need merely await the establishment of a liquid level prior to pouring the measured contents of tube 26 into a suitable receptacle.

The feature relative to absence of spigots or valves requiring manipulation by the user, is particularly notable and attention is also called to the fact that there are no parts which would tend to become disconnected during the compression of container 10 to force the liquid into the measuring tube 26.

Any number of the devices 24 may be provided having various capacities, and since the same are easily and quickly attached to the container 10 and removed therefrom, interchangeability presents no problem. It is contemplated that a number of containers 10 be provided for various liquids to be measured and dispensed, each having a closure cap such as at 20 but devoid of an opening 32 in the top wall 34 thereof. When the liquid from a particular container 10 is to be used, a selected device 24 with its cap 20 and sealing means 22 thereon, may be mounted on the container in place of the permanent closure cap.

While a preferred embodiment of the invention has been chosen for illustration, it is manifest that the same is capable of many changes and modifications within the spirit of the invention, and it is therefore, desired to be limited only by the scope of the appended claims.

Having thus described the invention what is claimed as new and desired to be secured by Letters Patent is:

1. A combination liquid measuring and dispensing device comprising in combination with a compressible container, a liquid flow conduit in said container and extending through the uppermost end of the latter; an elongated measuring tube having the lowermost end thereof disposed adjacent said uppermost end of the container exteriorly of the latter; and a laterally-extending pouring spout integral with the tube at the uppermost end thereof and provided with a restricted outlet orifice, said conduit extending into the tube through said lowermost end and on the longitudinal axis of the latter and being joined to said lowermost end of the tube in closing relationship thereto, a portion of the conduit within the tube extending at an angle in a direction oppositely to the pouring spout and terminating in an uppermost open end spaced from the pouring spout on one side of said longitudinal axis of the tube whereby, when the container is grasped and tilted to pour the contents of the tube through said orifice, said contents will not flow into the container through the conduit.

2. A combination liquiding measuring and dispensing device comprising in combination with a compressible container, a liquid flow conduit in said container and extending through the uppermost end of the latter; an elongated measuring tube having the lowermost end thereof disposed adjacent said uppermost end of the container exteriorly of the latter; and a laterally-extending pouring spout integral with the tube at the uppermost end thereof and provided with a restricted outlet orifice, said conduit extending into the tube through said lowermost end and on the longitudinal axis of the latter and being joined to said lowermost end of the tube in closing relationship thereto, a portion of the conduit within the tube extending at an angle in a direction oppositely to the pouring spout and terminating in an uppermost open end spaced from the pouring spout on one side of said longitudinal axis of the tube whereby, when the container is grasped and tilted to pour the contents of the tube through said orifice, said contents will not flow into the container through the conduit, a portion of the conduit within the container extending at an angle in the direction of the pouring spout, whereby to prevent flow of liquid from the container into the tube during the aforementioned pouring operation.

References Cited in the file of this patent

UNITED STATES PATENTS

| | | |
|---|---|---|
| 563,212 | Teetor | June 30, 1896 |
| 2,000,493 | Miller | May 7, 1935 |
| 2,022,271 | Bibb | Nov. 26, 1935 |
| 2,599,446 | Greene | June 3, 1952 |
| 2,677,480 | Wiczer | May 4, 1954 |